United States Patent
Shahar-Doron et al.

(10) Patent No.: US 11,041,948 B2
(45) Date of Patent: Jun. 22, 2021

(54) CHANNEL ESTIMATION COMBINING FOR SECURE TIME OF FLIGHT APPLICATIONS

(71) Applicant: Apple Inc., Cupertino, CA (US)

(72) Inventors: Ayelet Shahar-Doron, Modi"in (IL); Michael Kerner, Tel Mond (IL); Gilad Kirshenberg, Raanana (IL)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 16/377,323

(22) Filed: Apr. 8, 2019

(65) Prior Publication Data

US 2020/0319329 A1    Oct. 8, 2020

(51) Int. Cl.
| | | |
|---|---|---|
| *H04L 25/02* | (2006.01) | |
| *G01S 13/76* | (2006.01) | |
| *H04W 24/02* | (2009.01) | |
| *H04W 24/08* | (2009.01) | |
| *H04W 84/12* | (2009.01) | |

(52) U.S. Cl.
CPC ........ *G01S 13/765* (2013.01); *H04L 25/0256* (2013.01); *H04L 25/0258* (2013.01); *H04W 24/02* (2013.01); *H04W 24/08* (2013.01); *H04W 84/12* (2013.01)

(58) Field of Classification Search
CPC ..... H04L 1/1845; H04L 1/1848; H04L 1/188; H04L 1/203; H04L 25/0202; H04L 25/0204; H04L 25/022; H04L 25/0224; H04L 25/03038; H04L 25/03343; H04L 25/03955; H04L 25/067; H04L 27/26; H04L 27/2601; H04L 25/0256; H04L 25/0258; G01S 13/765; H04W 24/02; H04W 24/08; H04W 84/12
See application file for complete search history.

(56) References Cited

U.S. PATENT DOCUMENTS

| | | | |
|---|---|---|---|
| 5,126,746 A | 6/1992 | Gritton | |
| 7,995,644 B2 | 8/2011 | Sahinoglu et al. | |
| 10,001,555 B2 | 6/2018 | Seller | |
| 10,051,423 B1* | 8/2018 | Feinmesser | H04W 4/023 |
| 10,673,476 B2* | 6/2020 | Roy | H04L 25/03993 |
| 2007/0104282 A1* | 5/2007 | Vihriala | H04L 25/03159 |
| | | | 375/260 |
| 2011/0305286 A1* | 12/2011 | Shimezawa | H04L 27/2688 |
| | | | 375/260 |

(Continued)

FOREIGN PATENT DOCUMENTS

EP    2381633 A2    10/2011

OTHER PUBLICATIONS

International Search Report from Application No. PCT/US2020/027075, dated Jun. 26, 2020, twelve pages.

*Primary Examiner* — Phuc H Tran
(74) *Attorney, Agent, or Firm* — Kowert, Hood, Munyon, Rankin & Goetzel, P.C.

(57) ABSTRACT

This disclosure relates to techniques for performing ranging wireless communication in a secure manner. A first wireless device may receive a plurality of independent sequences from a second wireless device. The first wireless device may perform a combined channel estimate using the sequences. The first wireless device may estimate the distance (or angle/direction, among various possibilities) between the two devices based on the combined channel estimate.

20 Claims, 4 Drawing Sheets

(56) References Cited

U.S. PATENT DOCUMENTS

| | | | |
|---|---|---|---|
| 2016/0050094 A1* | 2/2016 | Ryu | ............... H04L 1/0001 370/329 |
| 2018/0292522 A1 | 10/2018 | Cavendish et al. | |
| 2019/0014466 A1 | 1/2019 | Seok et al. | |
| 2019/0037549 A1* | 1/2019 | Xu | ............... H04L 25/0224 |
| 2019/0044759 A1* | 2/2019 | Hedstrom | ......... H04L 25/03318 |
| 2019/0074930 A1 | 3/2019 | Kuchler et al. | |
| 2019/0098493 A1 | 3/2019 | Li et al. | |

\* cited by examiner

CHANNEL ESTIMATION COMBINING FOR SECURE TIME OF FLIGHT APPLICATIONS

TECHNICAL FIELD

The present application relates to wireless communication, including to techniques for performing ranging wireless communication.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

One use case for wireless communication includes ranging communication, e.g., estimating the distance between or relative location of multiple devices. Ranging can provide the distance between one wireless device and another. However, existing wireless communication technologies may suffer from poor performance. Accordingly, improvements in the field are desired.

SUMMARY

Embodiments are presented herein of, inter alia, systems, apparatuses, and methods for wireless devices performing ranging using channel estimation combining for secure time of flight (SToF) applications.

According to the techniques described herein, wireless ranging sessions/measurements may be performed in a secure manner that combines multiple, independent time domain sequences. The wireless device receiving the sequences (e.g., secure channel estimate (SCE) sequences) may combine some (or all) of the sequences on a per-tone basis. The device may use a modified zero forcing estimator or modified minimum mean square error (MMSE) estimator to estimate the frequency response of the channel using the combined sequences. A good per-tone combination of the independent sequence may avoid the need to handle frequency nulls, e.g., because it may be unlikely for 2 (or more) independent sequences to have frequency nulls at the same tone. Accordingly, the performance may be better than previous solutions (e.g., using channel estimates based on un-combined sequences).

The techniques described herein may be implemented in and/or used with a number of different types of devices, including but not limited to cellular phones, tablet computers, accessory and/or wearable computing devices, portable media players, vehicles, access points and other wireless local area network equipment, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device. A communication device may be referred to as a station or STA.

Base Station or Access Point (AP)—The term "Base Station" has the full breadth of its ordinary meaning, and at least includes a wireless communication station installed at a fixed location and used to communicate as part of a wireless telephone system or radio system. The term "access point" is used similarly.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network. Wi-Fi or WLAN may refer to technology based on IEEE 802.11 wireless standards such as 802.11a, 802.11.b, 802.11g, 802.11n, 802.11-2012, 802.11ac, 802.11ad, 802.11.ax, 802.11ay, 802.11az, and/or other IEEE 802.11 standards.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 1:
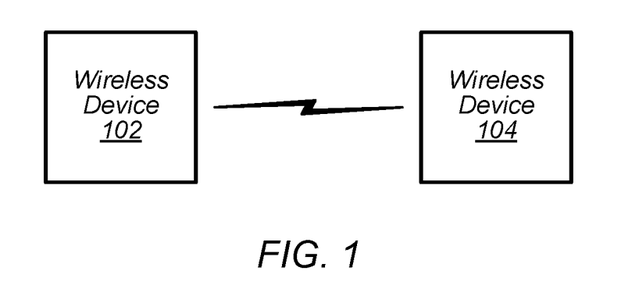
FIG. 1 illustrates an example wireless communication system, according to some embodiments.

FIG. 1—Wireless Communication System

FIG. 1 illustrates an exemplary (and simplified) wireless communication system in which aspects of this disclosure may be implemented. It is noted that the system of FIG. 1 is merely one example of a possible system, and embodiments of this disclosure may be implemented in any of various systems, as desired.

As shown, the exemplary wireless communication system includes a ("first") wireless device 102 in communication with another ("second") wireless device. The first wireless device 102 and the second wireless device 104 may communicate wirelessly using any of a variety of wireless communication techniques, potentially including ranging wireless communication techniques.

As one possibility, the first wireless device 102 and the second wireless device 104 may perform ranging using wireless local area networking (WLAN) communication technology (e.g., IEEE 802.11/Wi-Fi based communication) and/or techniques based on WLAN wireless communication. One or both of the wireless device 102 and the wireless device 104 may also be capable of communicating via one or more additional wireless communication protocols, such as any of Bluetooth (BT), Bluetooth Low Energy (BLE), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

The wireless devices 102 and 104 may be any of a variety of types of wireless device. As one possibility, one or more of the wireless devices 102 and/or 104 may be a substantially portable wireless user equipment (UE) device, such as a smart phone, hand-held device, a wearable device such as a smart watch, a tablet, a motor vehicle, or virtually any type of wireless device. As another possibility, one or more of the wireless devices 102 and/or 104 may be a substantially stationary device, such as a set top box, media player (e.g., an audio or audiovisual device), gaming console, desktop computer, appliance, door, access point, base station, or any of a variety of other types of device.

Each of the wireless devices 102 and 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components. For example, the wireless device 102 and/or the wireless device 104 may include one or more processors or processing elements that may be configured to cause the wireless device to cause the device to perform any of the method embodiments described herein, or any portion of any of the method embodiments described herein, using any or all of such components.

Each of the wireless devices 102 and 104 may include one or more antennas for communicating using one or more wireless communication protocols. In some cases, one or more parts of a receive and/or transmit chain may be shared between multiple wireless communication standards; for example, a device might be configured to communicate using either of Bluetooth or Wi-Fi using partially or entirely shared wireless communication circuitry (e.g., using a shared radio or at least shared radio components). The shared communication circuitry may include a single antenna, or may include multiple antennas (e.g., for multiple-input and multiple-output (MIMO)) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using one or more of LTE, CDMA2000 1×RTT, GSM, and/or 5G NR, and separate radios for communicating using each of Wi-Fi and Bluetooth. Other configurations are also possible.

As previously noted, aspects of this disclosure may be implemented in conjunction with the wireless communication system of FIG. 1. For example, the wireless devices 102 and/or 104 may perform one or more ranging wireless communication techniques or features described subsequently herein with respect to the Figures. By utilizing such techniques (and/or other techniques described herein), the wireless device(s) may (at least according to some embodiments) be able to achieve secure ranging communication with improved performance relative to previous techniques. The wireless devices 102 and/or 104 may be referred to as STAs.

Figure 2:
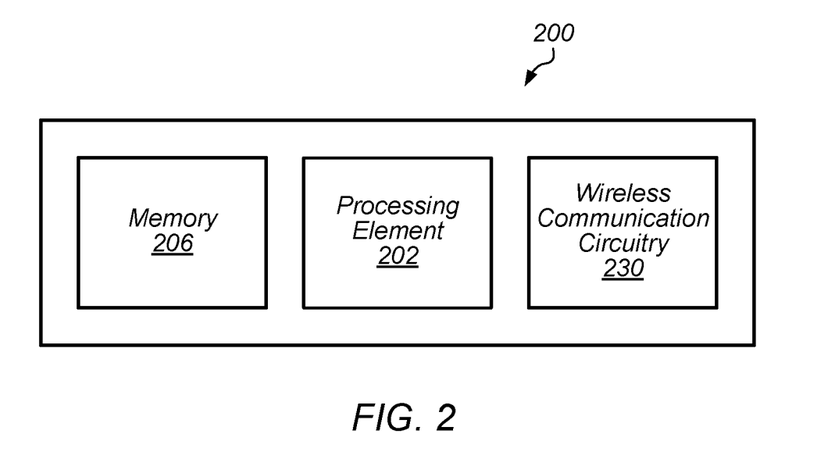
FIGS. 2 and 3 are block diagrams illustrating example wireless devices, according to some embodiments.
Figure 3:
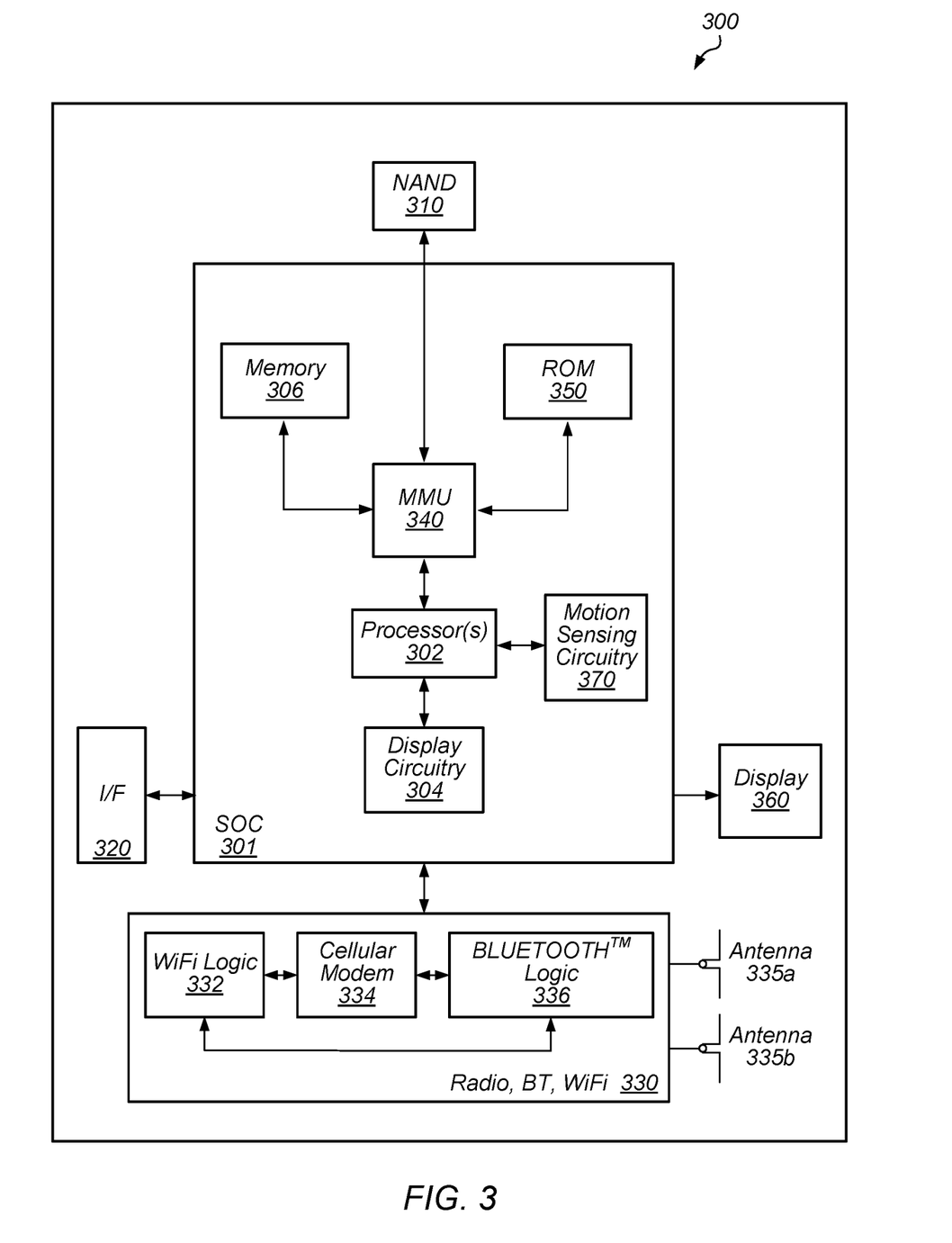

FIGS. 2-3—Exemplary Device Block Diagrams

FIG. 2 illustrates an exemplary wireless device 200 (e.g., corresponding to wireless devices 102 and/or 104) that may be configured for use in conjunction with various aspects of the present disclosure. The device 200 may be any of a variety of types of device and may be configured to perform any of a variety of types of functionality. The device 200 may be a substantially portable device (e.g., smart phone or accessory device, among various possibilities) or may be a substantially stationary device, potentially including any of a variety of types of device (e.g., an access point or base station, among various possibilities). The device 200 may be configured to perform one or more ranging wireless communication techniques or features, such as any of the techniques or features illustrated and/or described subsequently herein with respect to any or all of the Figures.

As shown, the device 200 may include a processing element 202. The processing element may include or be coupled to one or more memory elements. For example, the device 200 may include one or more memory media (e.g., memory 206), which may include any of a variety of types of memory and may serve any of a variety of functions. For example, memory 206 could be RAM serving as a system memory for processing element 202. Other types and functions are also possible.

Additionally, the device 200 may include wireless communication circuitry 230. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 230 may include its own processing element (e.g., a baseband processor), e.g., in addition to the processing element 202. For example, the processing element 202 might be an 'application processor' whose primary function may be to support application layer operations in the device 200, while the wireless communication circuitry 230 might be a 'baseband processor' whose primary function may be to support baseband layer operations (e.g., to facilitate wireless communication between the device 200 and other devices) in the device 200. In other words, in some cases the device 200 may include multiple processing elements (e.g., may be a multi-processor device). Other configurations (e.g., instead of or in addition to an application processor/baseband processor configuration) utilizing a multi-processor architecture are also possible.

The device 200 may additionally include any of a variety of other components (not shown) for implementing device functionality, depending on the intended functionality of the device 200, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 200, such as processing element 202, memory 206, and wireless communication circuitry 230, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 202, peripheral interfaces for communication with peripheral components within or external to device 200, etc.) may also be provided as part of device 200.

FIG. 3 illustrates one possible block diagram of a wireless device 300, which may be one possible exemplary implementation of the device 200 illustrated in FIG. 2. As shown, the wireless device 300 may include a system on chip (SOC) 301, which may include portions for various purposes. For example, as shown, the SOC 301 may include processor(s) 302 which may execute program instructions for the wireless device 300, and display circuitry 304 which may perform graphics processing and provide display signals to the display 360. The SOC 301 may also include motion sensing circuitry 370 which may detect motion of the wireless device 300, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 301 may be coupled to various other circuits of the wireless device 300. For example, the wireless device 300 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, NFC, GPS, etc.).

The wireless device 300 may include at least one antenna, and in some embodiments multiple antennas 335a and 335b, for performing wireless communication with base stations and/or other devices. For example, the wireless device 300 may use antennas 335a and 335b to perform the wireless communication. As noted above, the wireless device 300 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the wireless device 300 to perform Wi-Fi communications, e.g., on an 802.11 network. The Bluetooth Logic 336 is for enabling the wireless device 300 to perform Bluetooth communications. The cellular modem 334 may be capable of performing cellular communication according to one or more cellular communication technologies. Some or all components of the wireless communication circuitry 330 may be used for ranging communications, e.g., using WLAN, Bluetooth, and/or cellular communications.

As described herein, wireless device 300 may include hardware and software components for implementing embodiments of this disclosure. For example, one or more components of the wireless communication circuitry 330 (e.g., Wi-Fi Logic 332) of the wireless device 300 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Wireless Ranging and Secure Time of Flight (SToF)

Two wireless devices may engage in a ranging operation so that at least one of the wireless devices will be able to determine or estimate the range (e.g., distance) between the two devices, e.g., by measuring the amount of time that it takes to send messages between the devices. For example, the Fine Timing Measurement (FTM) protocol specified in 802.11-2016 may provide a time-of-flight (ToF) based mechanism to perform ranging between two 802.11/WiFi devices, according to some embodiments. In FTM, range may be determined as a function of several time instances (t1, t2, t3 and t4), where t1, t2, t3, and t4 correspond to the time of departure and time of arrival of measurement frames sent in both directions (e.g., uplink and downlink or from a first device to a second device and vice versa) between the two devices (e.g., the two STAs). For example, t1 may be the departure time from a first device, t2 may be the arrival at the second device, t3 may be the departure from the second device and t4 may be the arrival at the first device. Thus, t3−t2 may correspond to the processing time of the second device, t2−t1 may correspond to the one-way travel time from the first to the second device, and t4−t3 may be the one way travel time from the second device to the first. Thus, the round-trip time of flight may be calculated as (t4−t1)−(t3−t2), in other words total time less processing time. Standards under development (e.g., 802.11az) may aim to improve and/or optimize the ranging protocols for a variety of use cases, including very high throughput (VHT), high efficiency (HE), and/or 60 GHz (e.g., millimeter wave or mmWave) communications, among others. Further, improvements to scalability and security may be desired.

In some embodiments, the ranging protocol (e.g., within 802.11az) may include a common negotiation phase that may precede a ranging measurement phase of various ranging modes and/or packet sequences (e.g., FTM, High efficiency ranging for 802.11az (HEz), or VHT ranging for 802.11az (VHTz); it should be noted that these may be working names for various ranging modes, that these names may change, and that other ranging modes may be used). In the negotiation phase, an initiating STA (iSTA) may send an initial measurement request frame (e.g., an FTM measurement request frame, e.g., a negotiation frame). The measurement request frame may include a set of ranging parameters. For example, the measurement request frame may include scheduling parameters in one or more FTM parameters element or a set of range measurement parameter elements in a next generation positioning (NGP) parameters element, etc. The ranging parameters may describe the bandwidth or bandwidths available for ranging, the bandwidth measured by the iSTA, radio frequency (RF) related parameters, one or more modes of ranging supported by the iSTA, and/or ranging security requirements, among other possibilities. The frame contents may describe the iSTA's capability and availability for ranging measurement exchange. Among various possibilities, the frame may describe whether the iSTA supports secure ToF (SToF) measurement. SToF may be a new sensor feature for measuring the distance between 2 devices in a secure way. The SToF feature may be relevant to the 802.11az standard, which is still under development by IEEE.

A responding STA (rSTA) may indicate various ranging parameters in response to the initial measurement request frame from the iSTA. For example, the rSTA may indicate whether it supports SToF. The rSTA may send an acknowledgement (ACK) for the measurement request frame. The rSTA may also send a response frame (e.g., a first FTM measurement frame). In some embodiments, the measurement frame may be sent within milliseconds, e.g., 10 ms, of receiving the initial measurement request frame. Note that other response times or time delays are possible (e.g., 5 ms, 15 ms, tens of milliseconds, hundreds of milliseconds, etc.).

In SToF, pseudo-random sequences may be used for channel estimation fields in the waveform. The pseudo-random sequences may be coordinated between two sides of the SToF exchange (e.g., iSTA and rSTA). For example, during the negotiation phase the two devices may negotiate pre-coordinated seeds for generating the pseudo-random sequences. The pseudo-randomness of the sequences may serve to secure the exchange, e.g., in order to reduce or avoid the possibility that other devices may guess the sequence and pretend to be a legitimate station (e.g., involved in the SToF process), and thus interfere with the SToF process such that a wrong distance is estimated. In the SToF waveform, the pseudo-random sequences may be referred to as secure channel estimate (SCE) sequences or SCE field samples. The SToF waveform (e.g., an SToF postamble) may include various fields including a guard interval, any number of zero samples, and one or more SCE fields.

The SCE sequences may be generated by modulating pseudo random bits in time domain by pi/2 binary phase shift keying (BPSK) modulation (among other possibilities). The SCE sequences may be generated using the pre-coordinated seeds, e.g., so that each of the two devices performing the SToF may be able to calculate the sequences (e.g., to determine the known sequences to compare to received sequences). However, the properties of these pseudo-random sequences as known sequences for channel estimation may be poor. In particular, when transforming the time domain SCE sequences to the frequency domain, there is may be a relatively high probability that there will be frequency nulls (e.g., frequencies in which the sequence response is very low). In other words, following a Fast Fourier Transform (FFT) of the time domain sequence, the resulting frequency domain sequence may include different amplitudes for different frequencies (e.g., tones or frequency ranges). The amplitudes may include low (or zero) values for some frequencies. These low values may be referred to as frequency nulls. The channel estimation performance in the frequency nulls may be very low, e.g., due to low reliability and noise enhancement. For example, the channel estimate may be significantly impacted by noise in a frequency null (e.g., due to a zero forcing estimator inverting the channel, including in the frequency null). A zero forcing estimator may be given by equation 1:

$$\hat{H}(f) = \frac{Y(f) \cdot X^*(f)}{X(f) \cdot X^*(f)} = \frac{Y(f)}{X(f)}$$

In this equation, H(f) (hat) may be the estimated channel response as a function of frequency, Y(f) may be a received sequence, X(f) may be a known, transmitted sequence, and X*(f) may be the complex conjugate of X(f). Similarly, a minimum mean square error (MMSE) estimator may be used. For example, as illustrated in equation 2:

$$\hat{H}(f) = \frac{Y(f) \cdot X^*(f)}{X(f) \cdot X^*(f) + \sigma^2}$$

In this equation, $\sigma^2$ is a noise power estimate and other terms have the same meanings as in the zero forcing estimator.

Existing frequency domain estimators, including the zero forcing and MMSE estimators shown above may handle frequency nulls using non optimal techniques. In other words, at frequencies (f) for which X(f) is small, the value of H(f) (hat) may be very large or indefinite (e.g., because the denominator may be very small or zero), and therefore any noise at f may unduly bias the estimated channel response result.

It should be noted that in at least some alternative wireless ranging approaches, it may be possible to reduce or avoid the problem of frequency nulls by performing channel estimation in the time domain. However, performing the estimation in the time domain may be computationally intensive. For example, in the time domain, a good solution may be the least squares estimator:

$$\hat{h} = inv(S^H \cdot S) \cdot S^H \cdot y$$

In this equation, S is the Toeplitz matrix of the transmitted sequence, of size N (measurement length)×K (channel response length). Thus, y may be the received vector of size (N×1) and h (hat) is the channel estimation response of size K×1. Thus, to estimate the channel requires inverting the matrix (which has dimension of K×K). In 802.11ad, N=512 and K=128. In 802.11ay, the value of K may be 256, thus the solution may require inverting a matrix of 256×256. Frequency domain channel estimation may avoid such significant computation requirements. In some embodiments, SToF sequences may be generated in the time domain and transformed to the frequency domain. Accordingly, improvements in SToF performance are desired.

Figure 4:
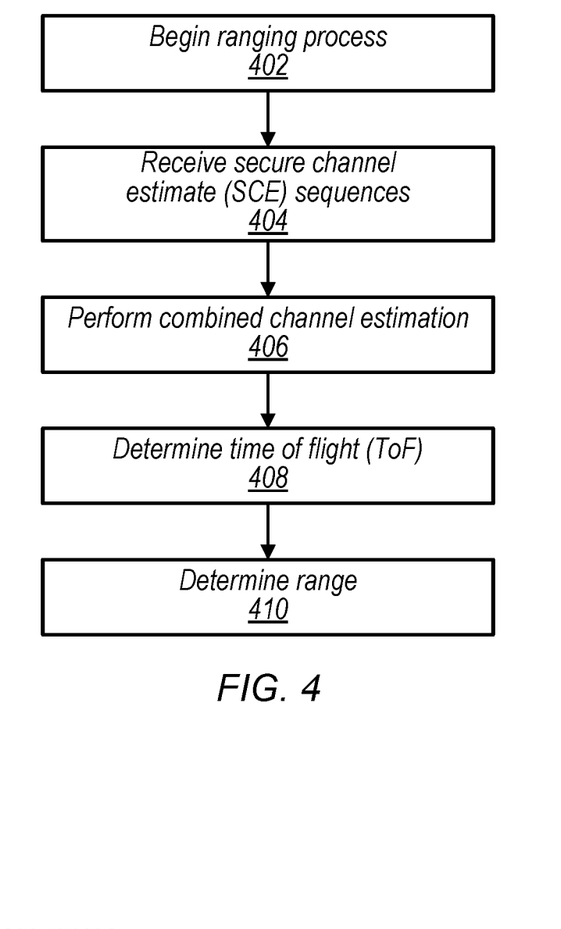
FIG. 4 is a flowchart diagram illustrating an exemplary method for performing ranging using channel estimation combining for secure time of flight (SToF) applications, according to some embodiments.

FIG. 4—Exemplary Method for Ranging Using Channel Estimation Combining for SToF

FIG. 4 is a flowchart diagram illustrating a method for performing ranging using channel estimation combining for secure time of flight (SToF) applications, according to some embodiments. In various embodiments, some of the elements of the method shown may be performed concurrently, in a different order than shown, may be substituted for by other method elements, or may be omitted. Additional method elements may also be performed as desired.

Aspects of the method of FIG. 4 may be implemented by a wireless device, such as the wireless devices 102, 104, 200, or 300 illustrated in and described with respect to FIGS. 1-3, or more generally in conjunction with any of the computer systems or devices shown in the Figures, among other circuitry, systems, devices, elements, or components shown in the Figures, among other devices, as desired. For example, one or more processors or processing elements, such as an application processor and/or a processor associated with wireless communication circuitry, of a wireless device 102, 104, 200, or 300 may case the wireless device to perform some or all of the illustrated method elements.

Note that while at least some elements of the method of FIG. 4 are described in a manner relating to the use of communication techniques and/or features associated with WLAN, such description is not intended to be limiting to the disclosure, and aspects of the method of FIG. 4 may be used in any suitable wireless communication system, as desired. Further, note that while at least some elements of the method of FIG. 4 are described in a manner relating to the use of communication techniques and/or features associated with measuring range/distance, these techniques can additionally or alternatively be applied to other types of measurements, such as measuring direction/angle, location, relative position, etc. In other words, these techniques may be applied to any of various spatial measurements. As shown, the method may operate as follows.

A first wireless device may begin a ranging process with a second wireless device (402). Either of the devices may initiate the ranging process (e.g., either the first or the second device may be the iSTA). The devices may negotiate various ranging parameters (e.g., time and frequency resources to use for ranging). The devices may indicate that they support SToF ranging, and may negotiate to use SToF. Such negotiation and indication may be performed by including various parameters or indicators in fields of one or more initial messages, such as an FTM measurement request frame and/or other negotiation frames, among various possibilities. The ranging process may be a secure ranging process, e.g., SToF.

The first wireless device may receive two or more secure channel estimate (SCE) sequences transmitted by the second wireless device (404). Any number of SCE sequences may be received. Among various possibilities, two or four SCE sequences may be received. The sequences may be different from each other. For example, the sequences may be independent of each other.

The SCE sequences may be received in one or more channel estimation fields, e.g., of an SToF waveform or postamble. Thus, the SCE sequences may be received sequentially, over a period of time. In some embodiments, other fields or guard periods may be received in between the SCE sequences.

In some embodiments, the first wireless device may also transmit SCE sequences to the second wireless device. The sequences transmitted by the first device may be different than those transmitted by the second wireless device. For example, the first wireless device may first generate first SCE sequences (e.g., using pseudo-random inputs and BPSK) and transmit the first SCE sequences to the second wireless device. The second wireless device may then generate and transmit second SCE sequences back to the first wireless device, and the first wireless device may then receive the second SCE sequences. It will be appreciated that the order may be reversed, e.g., the second device may send sequences first, and the first device may receive those sequences and then generate further sequences to send to the second device.

In some embodiments, one or more of the sequences may contain one or more frequency nulls. For example, any or all of the sequences may contain nulls at various frequencies or tones. As the sequences may be randomly (e.g., pseudo-randomly) generated, it may be unlikely that the sequences contain frequency nulls at the same frequencies.

The first wireless device may perform a combined channel estimation using some or all of the received sequences (406). In other words, the first wireless device may perform channel estimation based on per tone combining of 2 (or more) different time domain sequences. In other words, the combined channel estimation may be a single channel estimate calculated based on a plurality of independent sequences. The combining may be performed in the frequency domain. The combined estimation may consider 2 (or more) known transmitted sequences (e.g., SCE) and 2 (or more) corresponding, received sequences.

For example, the first wireless device may convert some or all of the received sequences to the frequency domain. The first wireless device may use a modified zero forcing estimator or a modified MMSE estimator to perform channel estimation in the frequency domain. In other words, the zero forcing estimator and/or MMSE estimator described above may be modified for estimating the channel using the desired number of sequences. For example, a modified zero forcing estimator for use with 2 different sequences may be constructed as shown in equation 3:

$$\hat{H}(f) = \frac{Y_1(f) \cdot X_1^*(f) + Y_2(f) \cdot X_2^*(f)}{X_1(f) \cdot X_1^*(f) + X_2(f) \cdot X_2^*(f)}$$

In this equation, $X_1$ and $X_2$ represent the first and second known sequences, $X_1^*$ and $X_2^*$ represent the complex conjugates of the first and second known sequences, and $Y_1$ and $Y_2$ represent the corresponding received sequences.

Similarly, a modified MMSE estimator may be constructed as shown in equation 4:

$$\widehat{H(f)} = \frac{Y_1(f) \cdot X_1^*(f) + Y_2(f) \cdot X_2^*(f)}{X_1(f) \cdot X_1^*(f) + X_2(f) \cdot X_2^*(f) + \sigma^2}$$

As in the case of the modified zero forcing estimator, a null in one sequence is unlikely coincide with a null in the other sequence.

In the event that one of the sequences, X, has a frequency null at a frequency, f, it may be unlikely that the other sequence also has a frequency null at the same frequency. Accordingly, it may be unlikely that the denominator of either of the modified estimators of equations 3 and 4 (in contrast to the unmodified estimators of equations 1 and 2) will be very small at any value of f and thus unlikely that H(f) will be very large or undefined at any value of f. In other words, the estimated channel may be definite at all values of f, even including values of f that are a frequency null for one of the sequences. Therefore, the problems of poor reliability described above may be avoided and compensating for frequency nulls may not be necessary. Thus, a channel estimate performed with either of the above modified estimators may be robust to frequency nulls. In other words, noise in the channel at a frequency, f, associated with a frequency null may not disproportionately impact the results of the channel estimation.

It will be appreciated that equations 3 and 4 may use multiple independent, received sequences, $Y_1$ and $Y_2$, to calculate a single, combined channel estimate. Such a combined channel estimate may be thought of as a multi-sequence or multi-factor channel estimate, because it is an individual estimation determined based on multiple received sequences and $Y_1$ and $Y_2$.

In some embodiments, more than 2 sequences may be used for a combined channel estimation. It will be appreciated that the modified zero forcing and/or modified MMSE estimators illustrated in equations 3 and 4 may be readily extended to include larger numbers of known and corresponding received sequences. For example, additional Y*X* terms may be added to the numerator and a corresponding X*X* may be added to the denominator for each additional sequence. Each additional sequence may further reduce the probability of frequency nulls occurring in all sequences at any given frequency f.

In some embodiments, more than one group of sequences may be used for performing multiple combined channel estimations. For example, if four sequences are used, a first combined channel estimate may be determined based on two of the sequences and a second combined channel estimate may be determined using the other two sequences. Other numbers of groups and group sizes may be used as desired. The combined channel estimates may then be further combined (e.g., averaged, or using other descriptive statistics such as a percentile, etc.).

It will be appreciated that, as used herein, the term "combined channel estimate" refers to a single estimate based on multiple, independent, input sequences. Such a combined channel estimate is distinct from an estimate that is determined by performing multiple estimates (e.g., using one received sequence each, e.g., a single received sequence and a corresponding known sequence) and then averaging or otherwise combining the estimates. In other words, a combined channel estimate may be determined using equation 3 or 4 (or similar equations). A combination of multiple channel estimates determined using equation 1 and/or 2 and then averaged (e.g., or otherwise combined after the channel estimates are determined) is not considered a combined channel estimate.

The first wireless device may determine a time of flight (ToF) (408). The ToF may be a round trip ToF. The ToF may be determined based at least in part on the channel estimate and/or on an arrival time of the received sequences. For example, if the first wireless device transmitted the SCE sequences to the second wireless device and later received other SCE sequences from the second wireless device, a ToF estimate (e.g., a coarse ToF) may be determined based on the difference in time between the time the SCE sequences were sent by the first wireless device and when they were received by the first wireless device. Further, the ToF may be adjusted based on an amount of time between when the sequences arrived at the second wireless device and when the second wireless device sent other SCE sequences to the first wireless device. In other words, the ToF may be adjusted based on the processing and transmission time of the second wireless device.

In some embodiments, the arrival time may be determined based in part on the channel estimate, e.g., based on the received sequences matching the known sequences with a sufficiently high confidence. The channel estimation may be used for a fine (e.g., more precise) ToF estimation. The fine ToF estimation may be determined based on finding the delay of the first arrival path (e.g., the first significant peak) in the channel estimate. For example, the arrival time may be estimated as the first time that the value of the channel estimator reaches a threshold value. Such a threshold value may indicate a match (e.g., with sufficient confidence) between the received sequences and the corresponding known sequences. Further, the fine ToF estimation may use a high resolution (e.g., "super resolution") which may be higher than the sample rate. There are multiple possible techniques to extract the first arrival path from a channel estimate, for example: maximum likelihood based methods, subspace based techniques, etc. Any or all of such techniques may be used to estimate the arrival time and thus the ToF. For example, a threshold based estimation may serve as a first, preliminary phase of a ToF estimation, and a more precise ToF estimation may be performed (e.g., in a second phase) using maximum likelihood based methods, subspace based techniques, etc.

In some embodiments, multiple ToFs may be calculated, e.g., using multiple channel estimates. The ToFs may be combined (e.g., averaged, or using other descriptive statistics such as a percentile, etc.). Similarly, a single ToF may be determined based on a combination (e.g., the average of, etc.) multiple channel estimates.

Based on the ToF, the first wireless device may determine a range (e.g., distance) to the second wireless device (410). For example, the first wireless device may calculate the range by multiplying the (e.g., round trip and adjusted for processing and retransmission time) ToF by the speed of light and dividing by 2. In some embodiments, the speed of light used for calculation purposes may be based on the medium (e.g., air, empty space, etc.).

In some embodiments, multiple ranges may be calculated, e.g., using multiple ToFs. The ranges may be combined (e.g., averaged, or using other descriptive statistics such as a percentile, etc.). Similarly, a single range may be determined based on a combination (e.g., the average of, etc.) multiple ToFs.

In some embodiments, the first wireless device may transmit the estimated range (or ranges) to the second wireless device and/or to one or more other devices. For example, the first wireless device may transmit the range to a companion device, a gaming device, a theft deterrent system (e.g., to detect merchandise that may be being removed from a store), and/or transmit the range to an application server (e.g., via the internet, and possibly using a WLAN and/or cellular link from the first wireless device to an access point and/or base station), among various possibilities.

It should be noted that, although the techniques of FIG. 4 have been presented in terms of SToF and range estimation, that the techniques of combined channel estimation may be useful in a variety of contexts. In other words, the techniques of FIG. 4 may be applied in various channel estimation scenarios in which objectives include accuracy or security and accuracy. For example, these techniques may be applied to methods for determining the direction or angle from one device to another, among various possibilities.

Figure 5:
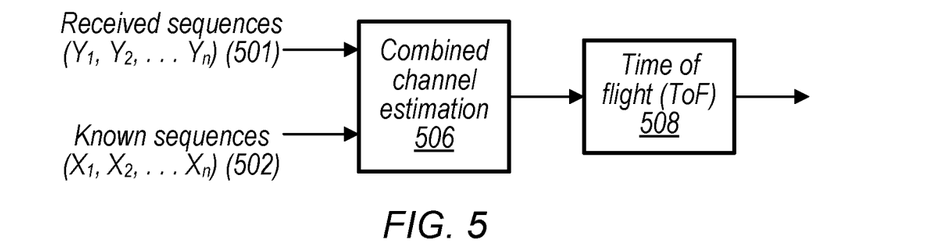
FIG. 5 is a block diagram illustrating an example combined channel estimation and SToF calculation, according to some embodiments.
Figure 6:
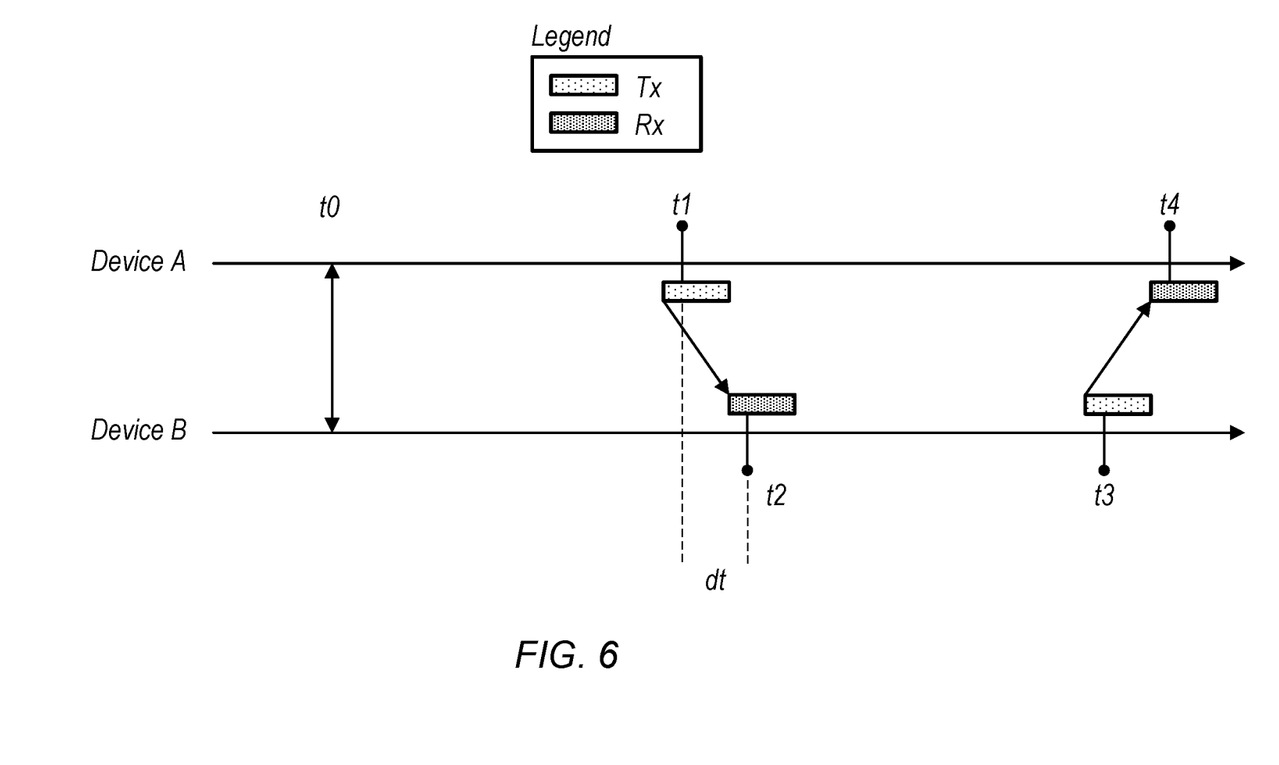
FIG. 6 is a communication flow diagram illustrating SToF, according to some embodiments.

FIGS. 5-6 and Additional Information

FIGS. 5-6 and the following additional information are provided as being illustrative of further considerations and possible implementation details relating to the method of FIG. 4. FIG. 5 is not intended to be limiting to the disclosure as a whole. Numerous variations and alternatives to the details provided herein below are possible and should be considered within the scope of the disclosure.

FIG. 5 is a block diagram illustrating an example combined channel estimation and SToF calculation, according to some embodiments. As illustrated, two or more received sequences ($Y_1$ to $Y_n$) (501) and two or more corresponding known sequences ($X_1$ to $X_n$) (502) may be inputs to a combined channel estimation calculation (506). The known sequences and received sequences may be time domain sequences. The combined channel estimation calculation may combine the received sequences in the frequency domain and may combine the known sequences in the frequency domain. The combined channel estimation calculation may estimate the channel using an estimator that is modified for use with such combined sequences. For example, the combined channel estimation calculation may use estimators such as illustrated by equations 3 or 4. Other estimators or variations on these estimators may be used as desired. The channel estimation may be used, along with the arrival time of the received sequences, to determine a ToF (508). The ToF may in turn be used to determine the range (or angle, direction, etc.) to a second device.

A good per tone combining of 2 (or more) independent sequence instances (e.g., in 506) may eliminate or reduce the need to handle frequency nulls because there may be a very low probability that in 2 independent sequences there will be frequency nulls in the same tones (e.g., frequencies). Thus, the combination of sequences may average the frequency response in each tone and may thus compensate for frequency nulls. The resulting performance may be much better than existing solutions (e.g., regular zero forcing, without per tone combining independent sequences).

FIG. 6 is a communication flow diagram illustrating SToF, according to some embodiments. Two devices (Device A and Device B) may, at time t0, exchanges any number of messages to negotiate an SToF procedure. For example, one of the devices, e.g., an initiating STA (e.g., Device B) may send an initial measurement request to the other device (e.g., a responding STA, e.g., Device A). The initial measurement request may be or include an initial FTM request. The second device may respond (e.g., with an ACK). In the measurement request and response, the devices may negotiate various parameters of the SToF, including agreeing on a pre-coordinated seed for generating known sequences. It will be appreciated that although the negotiation phase is illustrated at a single time, t0, that multiple messages may be included and that the negotiation may take any amount of time.

At a second time, t1, Device A may transmit a measurement signal (e.g., an FTM frame) which may include any number of known sequences to Device B.

At a third time, t2, Device B may receive the measurement signal. Device B may perform a channel estimate (e.g., a combined channel estimate using multiple known sequences and multiple corresponding received sequences from the measurement signal). At the time of the first significant peak of the channel estimate, Device B may determine time interval dt, e.g., the one-way ToF between the transmission of the known sequences by Device A and the reception of the corresponding received sequences by Device B. Device B may calculate a range based on this time interval.

At a fourth time, t3, Device B may transmit a second measurement signal (e.g., an FTM frame) which may include any number of known sequences to Device A. The known sequences of the second measurement signal may be different than the known sequences of the first measurement signal.

At a fifth time, t4, Device A may receive the second measurement signal. Device A may perform a channel estimate (e.g., a second combined channel estimate using multiple known sequences and multiple corresponding received sequences from the second measurement signal). At the time of the first significant peak of the second channel estimate, Device A may determine a time interval e.g., the one-way ToF between the transmission of the known sequences by Device B and the reception of the corresponding received sequences by Device A. Device A may further determine the round-trip ToF based on the time between t1 and t4 (e.g., the first significant peak of the second channel estimate). Device A may calculate a range based on the one-way and/or round-trip time intervals.

In the following, exemplary embodiments are provided.

One exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a wireless device 102 or 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A first wireless device, comprising:
an antenna;
a radio operably coupled to the antenna; and
a processing element operably coupled to the radio;
wherein the antenna, radio, and processing element are configured to:
  begin a secure ranging process with a second wireless device;
  receive at least two independent time domain sequences from the second wireless device;
  perform a combined channel estimation using the at least two independent time domain sequences, wherein the combined channel estimation is a single estimate based on the at least two independent time domain sequences and is distinct from performing multiple estimates using the at least two independent time domain sequences individually;
  determine a time of flight based at least in part on the combined channel estimation; and
  determine a range to the second wireless device using the time of flight.

2. The first wireless device of claim 1, wherein the at least two independent time domain sequences are secure channel estimate (SCE) sequences.

3. The first wireless device of claim 1, wherein the at least two independent time domain sequences are associated with at least two corresponding known sequences.

4. The first wireless device of claim 3, wherein the combined channel estimation is further based on the at least two corresponding known sequences.

5. The first wireless device of claim 3, wherein the at least two corresponding known sequences are determined by the first wireless device using a pre-coordinated seed.

6. The first wireless device of claim 3, wherein at least one of the at least two corresponding known sequences includes a frequency null, wherein the combined channel estimation is robust to the frequency null.

7. An apparatus, comprising:
a processor configured to cause a first wireless device to:
  perform a secure ranging process with a second wireless device, wherein to perform the secure ranging process the processor is further configured to cause the first wireless device to:
    receive a plurality of independent sequences from the second wireless device;
    convert the plurality of independent sequences to a plurality of frequency domain sequences;
    perform a combined channel estimation using the plurality of frequency domain sequences, wherein the combined channel estimation is a single estimation distinct from combining multiple estimations based on individual frequency domain sequences;
    determine a time of flight of at least one of the plurality of independent sequences based at least in part on the combined channel estimation; and
    determine a range based at least in part on the time of flight.

8. The apparatus of claim 7, wherein to perform the combined channel estimation comprises using a modified zero forcing estimator for use with a plurality of sequences.

9. The apparatus of claim 7, wherein to perform the combined channel estimation comprises using a modified minimum mean square error estimator for use with a plurality of sequences.

10. The apparatus of claim 7, wherein the plurality of independent sequences are received sequentially in channel estimation fields of a secure time of flight waveform.

11. The apparatus of claim 7, wherein the secure ranging process is an 802.11az secure time of flight process.

12. The apparatus of claim 7, wherein to perform the secure ranging process with the second wireless device, the processor is further configured to cause the first wireless device to:
generate a second plurality of independent sequences; and
transmit the second plurality of independent sequences to the second wireless device, wherein the time of flight is based on the difference in time between said transmitting the second plurality of independent sequences to the second wireless device and said receiving the plurality of independent sequences from the second wireless device.

13. The apparatus of claim 7, wherein to perform the secure ranging process with the second wireless device, the processor is further configured to cause the first wireless device to:
determine a pre-coordinated seed; and
determine a plurality of known sequences based on the pre-coordinated seed, wherein the plurality of independent sequences correspond to the plurality of known sequences, wherein the combined channel estimation is performed further using the plurality of known sequences.

14. The apparatus of claim 13, wherein to determine the time of flight includes determining a first significant peak in the combined channel estimation.

15. A method for securely estimating the range between a first device and a second device, the method comprising:
at the first device:
beginning a secure ranging process with a second wireless device;
receiving at least two independent time domain sequences from the second wireless device;
performing a combined channel estimation using the at least two independent time domain sequences, wherein the combined channel estimation is a single estimate based on the at least two independent time domain sequences and is distinct from performing multiple estimates using the at least two independent time domain sequences individually;
determining a time of flight based at least in part on the combined channel estimation; and
determining a range to the second wireless device using the time of flight.

16. The method of claim 15, wherein the at least two independent time domain sequences are secure channel estimate (SCE) sequences.

17. The method of claim 15, wherein the at least two independent time domain sequences are associated with at least two corresponding known sequences.

18. The method of claim 17, wherein the combined channel estimation is further based on the at least two corresponding known sequences.

19. The method of claim 17, wherein the at least two corresponding known sequences are determined by the first device using a pre-coordinated seed.

20. The method of claim 17, wherein at least one of the at least two corresponding known sequences includes a frequency null, wherein the combined channel estimation is robust to the frequency null.

* * * * *